Oct. 18, 1932.  S. C. CARTER  1,883,550
POWER TRANSMISSION
Filed Jan. 26, 1931   2 Sheets-Sheet 2
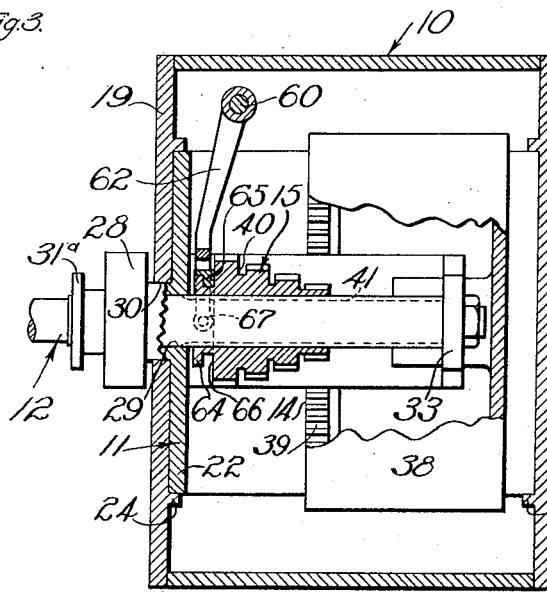
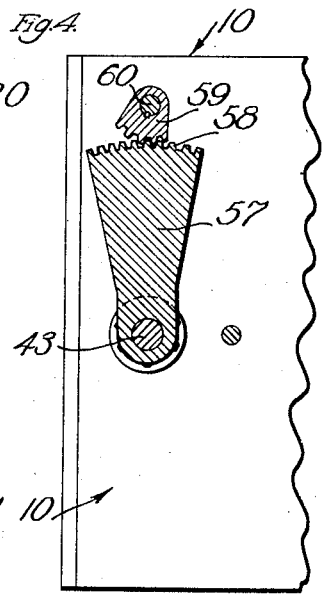
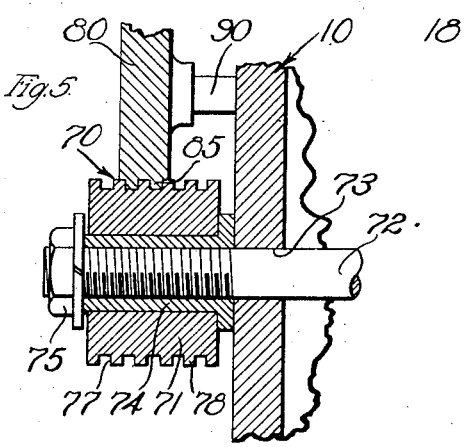
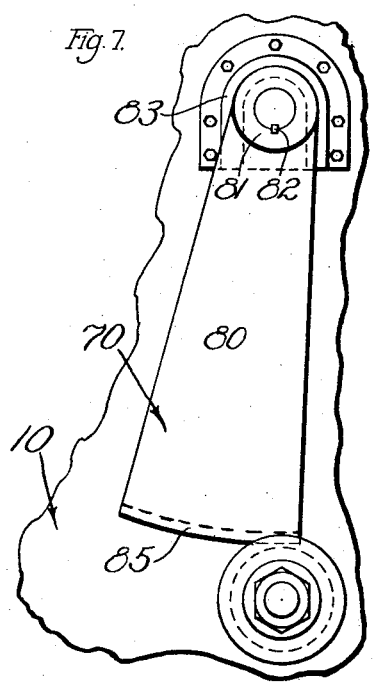
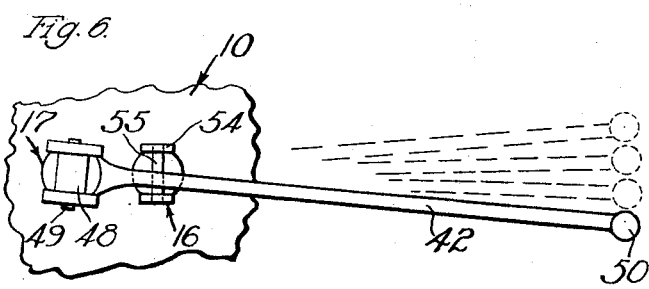
INVENTOR
SAMUEL C. CARTER
BY
HIS ATTORNEY Patented Oct. 18, 1932

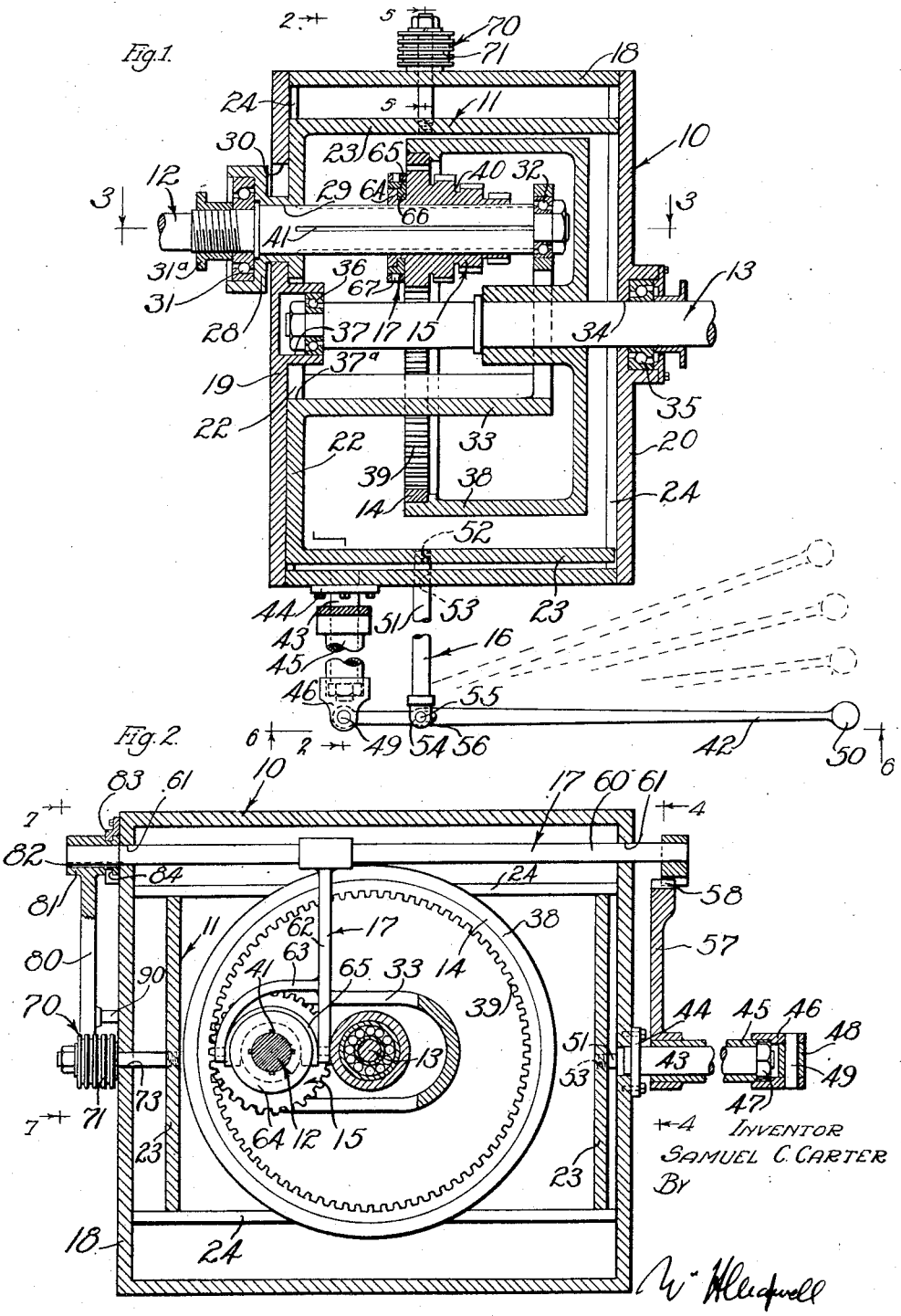

1,883,550

UNITED STATES PATENT OFFICE

SAMUEL C. CARTER, OF LOS ANGELES, CALIFORNIA, ASSIGNOR OF ONE-HALF TO ROBERT F. BELCHER, OF LOS ANGELES, CALIFORNIA

POWER TRANSMISSION

Application filed January 26, 1931. Serial No. 511,192.

This invention relates to a power transmission, and relates more particularly to a variable speed transmission mechanism. It is a general object of the invention to provide a simple, practical, and effective power transmission by means of which a plurality of speed ratios may be obtained between a drive shaft and a driven shaft.

It is an object of the invention to provide a variable speed and speed reducing transmission that embodies but few main working parts. The transmission mechanism provided by this invention includes a single gear on the driven or low-speed shaft, and a group or set of pinions of different effective diameters, on the drive or high-speed shaft, that may be selectively brought into mesh with the gear.

It is another object of the invention to provide a power transmission of the character mentioned that embodies a novel and improved means for shifting or bringing any one of the several pinions on the high-speed shaft into engagement with the gear on the low-speed shaft to provide for the desired ratios of speed between the shafts.

Another object of the invention is to provide a transmission mechanism of the character mentioned that is fully controllable by a single lever or operating member.

It is another object of the invention to provide a transmission mechanism of the character mentioned that embodies an improved means for locking the parts in position so that the pinions and gear cannot be released or disengaged by vibration or driving strains.

It is a further object of the invention to provide a mechanism of the character mentioned that is particularly simple and compact.

It is another object of the invention to provide a transmission of the character mentioned that is particularly well suited for use on a lathe or like machine.

Other objects and features of the invention will be best and more fully understood from the following detailed description of a typical form and application of the invention, throughout which description reference is had to the accompanying drawings, in which:

Fig. 1 is a central detailed sectional view of the mechanism, showing the largest pinion in mesh with the gear on the low-speed shaft. Fig. 2 is a transverse detailed sectional view taken as indicated by line 2—2 on Fig. 1. Fig. 3 is a detailed sectional view taken as indicated by line 3—3 on Fig. 1, showing the group of pinions positioned where the small pinion may mesh with the low-speed gear. Fig. 4 is a vertical detailed sectional view taken as indicated by line 4—4 on Fig. 2. Fig. 5 is an enlarged detailed sectional view of the lock means, being a view taken as indicated by line 5—5 on Fig. 1. Fig. 6 is an elevation or plan view of the shifting or operating handle, being a view taken as indicated by line 6—6 on Fig. 1, and Fig. 7 is an enlarged elevation of the lock mechanism, being a view taken as indicated by line 7—7 on Fig. 2.

The mechanism provided by this invention includes, generally, a housing or casing 10, a carriage or mounting 11 shiftably mounted in the casing, a drive or high-speed shaft 12 extending into the housing and supported by the mounting 11, a driven or low-speed shaft 13 extending into the casing 10 and carrying a gear 14, a set or group of pinions 15 of different effective diameters slidably mounted on the high-speed shaft 12, means 16 for shifting the mounting 11 to various positions in the casing 10 so that the pinions 15 may be brought into mesh with the gear 14, and means 17 interconnected with the means 16 for shifting the pinions 15 along the shaft 12 to bring them into engagement with the gear 14.

The housing or casing 10 is provided to carry or encase the various parts of the mechanism. The casing may be of any suitable shape and construction. In the particular case illustrated in the drawings, the casing 10 includes a main tubular section 18 of rectangular cross sectional configuration and end plates 19 and 20 closing the opposite ends of the section 18.

The carrier or mounting 11 is arranged within the casing 10 and is provided to support the shaft 12. The mounting 11 is shiftable transversely in the casing by the means 16. In the embodiment of the invention illustrated in the drawings, the mounting 11 is in the nature of a hollow substantially rectangular structure including an end section 22 slidably mounted on the inner side of the end plate 19, and sides 23 projecting from opposite ends of the section 22 and extending through the casing to the inner side of the plate 20. The mounting 11 is guided for movement in the casing 10 by spaced guides 24 on the inner sides of the end plates 19 and 20.

The end portion of the drive shaft or high-speed shaft 12 is rotatably supported by the mounting 11 and carries the pinions 15. An extension or box 28 projects outwardly from the side 22 of the mounting and the shaft 12 extends through an opening 29 in the box 28 and the section 22 to project into the mounting 11. The box 28 extends through an elongated opening 30 in the end plate 19 and projects from the casing 10. A suitable bearing 31 may be mounted in the box 28 to rotatably support the shaft 12. A collar 31ª may be provided on the shaft 12 to retain the bearing 31 in position. The shaft 12 extends a considerable distance through the mounting 11, and its inner end may be spaced a short distance from the end plate 20. A bearing 32 may be provided for supporting the inner end of the shaft 12. The bearing 32 may be carried by a flange or bridge 33 projecting from the end section 22 of the mounting 11.

The driven or low-speed shaft 13 is arranged parallel to the shaft 12 and is spaced inwardly of the high-speed shaft 12. The shaft 13 extends through an opening 34 in the end plate 20 to project into the casing 10. A suitable bearing 35 is mounted in a box on the end plate 20 to rotatably support the shaft 13. The shaft 13 may extend completely through the mounting 11 and its inner end may be supported on the plate 19. The inner end of the shaft 13 may be carried by a bearing 36 arranged in a socket 37 in the end plate 19 of the casing projecting through an opening 37ª in the section 22.

The gear 14 is mounted or keyed on the shaft 13 and is disposed within the casing 10. In accordance with the invention, the gear 14 is in the nature of a ring gear or internal gear and is mounted on the shaft 13 adjacent the end plate 20. The driven gear 14 may have an inwardly extending axial flange 38. The flange 38 is of comparatively large diameter and extends around or surrounds the inner end of the high-speed shaft 12. A ring having gear teeth 39 is provided on the inner side of the flange 38 at its inner end.

The set or group of pinions 15 is mounted on the shaft 12 within the casing 10. The pinions 15 are slidable longitudinally on the shaft 12, as a unit or group, to various positions to be selectively brought into engagement with the teeth 39 of the driven gear. In accordance with the invention, there are a plurality of pinions 15 arranged in a cluster or group on the shaft. In the particular embodiment of the invention illustrated in the drawings, there are four pinions 15 of different effective diameters. The series of pinions 15 may be formed on an integral body or member. The group of pinions 15 is connected to the shaft 12 to rotate therewith and slide thereon by a plurality of splines 41. In accordance with the invention, the several pinions 15 are graduated or stepped, that is, the pinions are positioned and related so that they are stepped from the smallest at one end of the group up to the largest at the other end of the group. In the preferred form of the invention, the largest pinion is at the end of the group adjacent or nearest the section 22 of the carrier 11. The teeth or effective portions of the several pinions 15 are spaced by clearance grooves 40.

The means 16 is manually operable to shift the carriage or mounting 11 to various positions in the casing so that any one of the several pinions 15 may be operable by the means 17 into engagement with the gear 14. It is a feature of the invention that the means 16 and 17 are both operable or controlled by a single operating member or lever 42. The means 16 and 17 are interconnected and certain parts of the mechanism are common to both of the means.

The means 16 is in the nature of a lever means and includes a stub shaft 43 mounted on the exterior of the main section 18 of the casing 10. The shaft 43 projects outwardly from the casing and is transversely disposed relative to the shafts 12 and 13. In the particular case illustrated, the stub shaft 43 is attached to the casing 10 by a flange connection 44. A sleeve 45 surrounds and is freely rotatable on the stub shaft 43. A clevis 46 is mounted on the outer end of the sleeve 45 beyond the end of the shaft 43. The sleeve 45 is held against longitudinal movement on the stub shaft 43 by a nut 47 threaded onto the end of the shaft.

The shifting lever 42 is pivotally mounted in the clevis 46. The lever 42 is provided with an enlarged portion 48 pivotally held in the clevis 46 by a pivot pin 49. The shift lever 42 normally projects laterally outward from the end of the stub shaft 43 or substantially parallel with the shafts 12 and 13. The lever 42 may be comparatively long, and a suitable handle or knob 50 may be provided on its outer end. A rod 51 operatively connects the shift lever 42 with the mounting 11. The inner end of the rod 51 may be threaded into an opening 52 in a side 23 of the mounting. The rod 51 projects outwardly through an opening 53 in the casing 10. The rod 51 is slidable in the opening 53 and its outer end is pivotally connected to the lever 42 at a point spaced from its pivotal axis.

The outer end of the shaft 51 is yoked to have spaced arms 54. The lever 42 extends between the arms 54, and a pivot pin 55 is carried by the arms extends through an elongated opening 56 in the lever. The opening 56 is sufficiently long to permit oscillation or pivoting of the lever 42 on the pivot pin 49. The yoked parts or arms 54 are spaced a considerable distance apart so that the lever 42 may be shifted laterally between them to oscillate the sleeve 45, as will be hereinafter described. It will be apparent how the mounting 11 may be shifted within the casing 10 by operating or pivoting the lever 42 on the pivot pin 49.

The means 17 for sliding or operating the group of pinions 15 along the shaft 12 is actuated or controlled by the lever 42 and includes a sector arm 57 projecting from the sleeve 45 and carrying gear teeth 58 on its outer end. The arm 57 projects radially outward from the sleeve 45. The teeth 58 mesh with a sector pinion 59 carried on a shaft 60. The shaft 60 is disposed transversely of the shafts 12 and 13 and is spaced outward of or above the shafts 12 and 13. The rod or shaft 60 may extend completely through the casing 10 and may have its end parts projecting from opposite sides of the main section 18 of the casing. The shaft 60 is carried for longitudinal movement and may be rotatably and slidably supported in openings 61 in the casing. The sector pinion 59 is mounted on a projecting end part of the shaft 60 to rotate therewith. It will be apparent that oscillation of the sleeve 45 will cause pivoting or oscillation of the shaft 60.

An operative shift connection is provided between the shaft 60 and the group of pinions 15 whereby rotation or oscillation of the shaft 60 causes the pinions to be slid or operated longitudinally on the shaft 12. The operative connection between the shaft 60 and the pinions 15 includes an arm 62 projecting downwardly or inwardly from the shaft 60 and carrying a fork 63 on its lower end. The fork 63 extends partially around a hub 64 on the outer end of the pinion group 15 and carries a yoke 65 engaging the hub. The yoke 65 seats in a groove 66 in the hub 64 and is provided with diametrically opposite pins 67 pivotally carried in openings in the arms of the fork 63. Swinging or oscillation of the lever 42 to any of the various positions indicated by the broken lines in Fig. 6 of the drawings causes oscillation of the shaft 60 and longitudinal movement of the group of pinions 15 on the shaft 12.

In operating the mechanism to provide for different speed ratios, the carriage or mounting 11 is first shifted to bring the teeth 39 of the driven gear into radial alignment with a given pinion 15 by operating the shaft lever 42 to one of the positions indicated by broken lines in Fig. 1 of the drawings, and the pinions 15 are then slid along the shaft 12 to bring the said pinion into mesh with the teeth 39 by pivoting the lever 42 on the pin 49 to one of the positions shown in Fig. 6 of the drawings. The present invention provides a lock means 70 for locking the parts of the mechanism in position to provide for any one of the several ratios of speed between the shafts 12 and 13. The lock means is such that the mounting 11 cannot be shifted to allow the pinions to move radially out of mesh with the teeth 39 by vibration or driving strains during operation. The lock means 70 is controlled or operated by the shift lever 42 and is operable to releasably lock the mechanism in any one of its various positions.

The means 70 includes a spool 71 carried by the mounting 11. The spool 71 may be carried on a rod 72 projecting from one end 23 of the mounting 11. The rod 72 may project through an opening 73 in the section 18 to project from the casing. The spool 71 is mounted on a sleeve or bushing 74 screw-threaded on the projecting end part of the rod. The bushing 74 may be locked in position on the rod, and the spool 71 may be retained on the bushing by means of a nut 75 threaded on the rod. The spool 71 may be freely rotatable on the bushing 74. A plurality of annular grooves 77 are provided in the periphery of the spool 71. The grooves 77 are equally spaced apart and provide a plurality of spaced annular teeth 78 on the spool 71.

An arm 80 is carried on the outer projecting end of the shaft 60. The arm 80 is provided with a hub 81 passing the shaft 60. The hub and arm are connected with the shaft by a sliding key connection 82. The arm 80 is held against longitudinal movement by a flange member 83 mounted on the exterior of the casing co-operating with a groove 84 in the hub 81. The arm 80 projects from the hub 81 toward the spool 71 and is provided at its outer end with spaced ribs or teeth 85 to co-operate with the teeth 78. The teeth 85 are curved and are related to the teeth 78 of the spool 71 so that the arm 80 may be swung to bring them into and out of mesh with the teeth 78. The teeth 78 are in engagement with the teeth 85 of the spool when any one of the several pinions 15 is in mesh with the driven gear 14. It will be obvious how the engagement of the teeth 78 with the teeth 85 prevents radial or transverse shifting of the mounting 11 relative to the shaft 13 so that the given pinion 15 cannot shift out of mesh with the teeth 39. During operation, the co-operation between the gear teeth 39 and a pinion 15 tends to shift the mounting 11 inward. This force tending to shift the mounting 11 and the shaft 12 is transmitted to the arm 80 by the rod 72 and spool 71. A bearing or support projection 90 is provided on the arm 80 to transmit the inward strains to the housing 10.

During operation of the mechanism, the lock means 70 holds the mounting 11 against shifting in the casing 10 so that one of the pinions 15 is retained in meshing engagement with the teeth 39 of the driven gear 14. Assuming that it is desired to shift the parts from the position illustrated in Figs. 1, 2, 4, 5, 6, and 7 of the drawings to bring the second largest pinion 15 into driving engagement with the gear 14, the lever 42 is operated downward to oscillate the sleeve 45 and shaft 60 to cause the group of pinions 15 to be shifted a short distance toward the end plate 20 of the housing. This movement of the shaft 60 causes the arm 80 to be shifted outwardly from the spool 71 so that the teeth 85 are disengaged from the teeth 78. Upon the releasing of the lock means as just described, the lever handle 42 may be pivoted on the pin 49 to shift the mounting 11 carrying the shaft 12 and the pinions 15 to a position where the second largest pinion is in axial alignment with the gear teeth 39. The lever arm 42 may then be manually operated to oscillate the sleeve 45 and sector arm 57 to cause oscillation of the shaft 60 in a direction to shift the group of pinions 15 toward the section 22 of the mounting. Sufficient movement of the lever 42 in this direction will bring the teeth of the second largest pinion into engagement with the teeth 39 of the driven gear. Swinging or oscillation of the lever 42 in a direction to slide the pinions 15 toward the driven gear 14 oscillates the shaft 60 to bring the arm 80 of the lock means to a position where its teeth 85 are in locking engagement with the teeth 78 of the spool 71. It will be apparent how any one of the several pinions 15 may be brought into mesh with the teeth of the driven gear 14 in the above manner.

It is to be noted that the lock means 70 must be disengaged by shifting the group of pinions 15 to an extreme out position before the means 16 or 17 may be operated for shifting the mounting 11. The shifting of the mounting 11 and the pinions 15 may be controlled entirely by the operating lever 42. The lock means 70 is also releasable by means of the lever 42. The mechanism involves a minimum number of main working parts which may be completely housed within the casing 10.

There may be any desired number of pinions 15 and they may be related to the low speed gear 14 to provide for substantial reductions in speed. The various speeds may be obtained by operating the single control lever 42. The gear shifting mechanisms or means 16 and 17 are particularly simple in construction and embody only one shifting fork.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A power transmission including, a housing, a mounting shiftable in the housing, a high speed shaft rotatably carried by the mounting, a low speed shaft extending into the housing and having a relatively stationary axis of rotation, a gear on the low speed shaft within the housing, a group of pinions of different effective diameters slidable on and rotatable with the high speed shaft, means supporting the high speed shaft on the mounting at points spaced from the opposite ends of the group of pinions, means for shifting the mounting to positions where the pinions are in alignment with the gear, and means for sliding the pinions along the high speed shaft into engagement with the gear.

2. A power transmission including, a high speed shaft, a low speed shaft having a relatively stationary axis of rotation, a gear on the low speed shaft, means rotatably supporting the low speed shaft at opposite ends of the gear, pinions of different effective diameters slidable on and rotatable with the high speed shaft, means for shifting the high speed shaft transversely of its longitudinal axis to positions to align any one of the pinions with the gear, and means for sliding the pinions along the high speed shaft to shift them into and out of mesh with the gear.

3. A transmission, including a housing, a high speed shaft extending into the housing, a shiftable mounting in the housing carrying the high speed shaft, a group of pinions slidable longitudinally on the high speed shaft and rotatable therewith, a low-speed shaft, having a relatively stationary axis of rotation, extending into the housing and a gear on the low speed shaft, rotatably supporting the high speed shaft on the mounting beyond the opposite ends of the group of pinions, means for shifting the mounting to bring any one of the pinions into axial alignment with the gear including, a lever, and a connection between the lever and the mounting, and means operable by the lever for sliding the pinions along the high-speed shaft.

4. A transmission including, a high speed shaft, a shiftable mounting carrying the high speed shaft, a group of pinions slidable longitudinally on the high speed shaft and rotatable therewith, means rotatably supporting the high speed shaft on the mounting at points spaced from the opposite ends of the group of pinions, a low speed shaft having a relatively stationary axis of rotation, a gear on the low speed shaft, means rotatably supporting the low speed shaft at opposite ends of the gear, means for shifting the mounting to bring any one of the pinions into axial alignment with the gear including, a pivoted member, and a connection between the member and the mounting, means operable by the member for sliding the pinions along the high-speed shaft, and means for locking the mounting against movement in a position where a pinion is meshing with the gear.

5. A transmission including a housing, a high speed shaft extending into the housing, a shiftable mounting in the housing carrying the high speed shaft, a group of pinions slidable longitudinally on the high-speed shaft and rotatable therewith, a low speed shaft having a relatively stationary axis of rotation extending into the housing, a gear on the low speed shaft in the housing, bearings carried on opposite walls of the housing and supporting the low speed shaft, means for shifting the mounting to bring any one of the pinions into axial alignment with the gear including, a pivoted member, and a connection between the member and the mounting, means operable by the member for sliding the pinions along the high-speed shaft, and means for locking the mounting against movement in a position where a pinion is meshing with the gear releasable by operation of the member.

6. A transmission including, two substantially parallel shafts, a mounting shiftable radially relative to the shafts and carrying one of the shafts, a group of pinions slidable longitudinally on the said shaft, a gear on the other shaft, the said other shaft having a relatively stationary axis of rotation, bearings on the mounting supporting the first mentioned shaft at points beyond the opposite ends of the group of pinions, means for shifting the mounting to bring a pinion and the gear into axial alignment, including a pivoted lever and a rod connecting the lever with the mounting, and means for sliding the pinions along the said shaft to bring a pinion into mesh with the gear.

7. A power transmission including, two substantially parallel shafts, a mounting shiftable radially relative to the shafts and carrying one of the shafts, a group of pinions slidable longitudinally on one shaft and a gear on the other shaft, means for shifting the mounting to bring a pinion and the gear into axial alignment including, a pivoted lever, and a rod connecting the lever with the mounting, and means for sliding the pinions along the said shaft to bring a pinion into mesh with the gear including an oscillatable member pivotally supporting the lever, a shaft transverse of the said two shafts, an operative connection between the member and the transverse shaft, and a connection between the transverse shaft and the group of pinions.

8. A power transmission including, two substantially parallel shafts, a mounting shiftable radially relative to the shafts and carrying one of the shafts, a group of pinions slidable longitudinally on one shaft, a gear on the other shaft, means for shifting the mounting to bring a pinion and the gear into axial alignment including, a pivoted lever and a rod connecting the lever with the mounting, and means for sliding the pinions along the said shaft to bring a pinion into mesh with the gear including, an oscillatable member pivotally supporting the lever, a shaft transverse of the said two shafts, a pinion on the transverse shaft, a sector arm on the member engaging the said pinion, and a fork carried by the transverse shaft for shifting the group of pinions.

9. A power transmission including, two substantially parallel shafts, a mounting shiftable radially relative to the shafts and carrying one of the shafts, a group of pinions slidable longitudinally on one shaft and a gear on the other shaft, means for shifting the mounting to bring a pinion and the gear into axial alignment, including a pivoted lever and a rod connecting the lever with the mounting, and means for sliding the pinions along the said shaft to bring a pinion into mesh with the gear including, an oscillatable member pivotally supporting the lever, a shaft transverse of the said two shafts, and means for releasably setting the mounting against movement.

10. A power transmission including, two substantially parallel shafts, a mounting shiftable radially relative to the shafts and carrying one of the shafts, a group of pinions slidable longitudinally on one shaft and a gear on the other shaft, means for shifting the mounting to bring a pinion and the gear into axial alignment including, a lever and a connection between the lever and the mounting, means for shifting the group of pinions along the shaft including, an oscillatable shaft, and means for releasably setting the mounting against movement including, a toothed member carried by the mounting and a toothed arm on the oscillatable shaft to co-operate with the toothed member.

11. A power transmission including, two substantially parallel shafts, a mounting shiftable radially relative to the shafts and carrying one of the shafts, a group of pinions slidable longitudinally on one shaft and a gear on the other shaft, means for shifting the mounting to bring a pinion and the gear into axial alignment including, a lever and a connection between the lever and the mounting, means for shifting the group of pinions along the shaft including, an oscillatable shaft, and means releasable by the oscillatable shaft for setting the mounting against movement.

In witness that I claim the foregoing I have hereunto subscribed my name this 2nd day of January 1931.

SAMUEL C. CARTER.